United States Patent
Moszner

(10) Patent No.: US 12,496,069 B2
(45) Date of Patent: Dec. 16, 2025

(54) ATRIAL APPENDAGE OCCLUDER FOR CLOSING THE LEFT ATRIAL APPENDAGE

(71) Applicant: CORMOS MEDICAL GMBH, Jena (DE)

(72) Inventor: Robert Moszner, Bad Klosterlausnitz (DE)

(73) Assignee: CORMOS MEDICAL GMBH, Jena (DE)

( * ) Notice: Subject to any disclaimer, the term of this patent is extended or adjusted under 35 U.S.C. 154(b) by 334 days.

(21) Appl. No.: 17/787,577

(22) PCT Filed: Dec. 29, 2020

(86) PCT No.: PCT/EP2020/087953
§ 371 (c)(1),
(2) Date: Jun. 20, 2022

(87) PCT Pub. No.: WO2021/136764
PCT Pub. Date: Jul. 8, 2021

(65) Prior Publication Data
US 2022/0409211 A1 Dec. 29, 2022

(30) Foreign Application Priority Data

Dec. 31, 2019 (DE) .......................... 102019009091.8
May 18, 2020 (DE) .......................... 102020003145.5

(51) Int. Cl.
*A61B 17/12* (2006.01)
*A61B 17/00* (2006.01)

(52) U.S. Cl.
CPC .. *A61B 17/12122* (2013.01); *A61B 17/12031* (2013.01); *A61B 17/12172* (2013.01);
(Continued)

(58) Field of Classification Search
CPC ........ A61B 17/12122; A61B 17/12113; A61B 17/12031; A61B 17/12172;
(Continued)

(56) References Cited

U.S. PATENT DOCUMENTS

| 2007/0167980 A1* | 7/2007 | Figulla ............ A61B 17/12177 606/213 |
| 2012/0271337 A1* | 10/2012 | Figulla ............ A61B 17/12168 87/9 |
| 2015/0133989 A1* | 5/2015 | Lubock ............ A61B 17/12109 606/200 |

FOREIGN PATENT DOCUMENTS

| DE | 102012003021 A1 | 10/2012 | ............... A61F 2/02 |
| DE | 102016012395 A1 | 5/2018 | ............ A61B 17/00 |

(Continued)

OTHER PUBLICATIONS

The Notification Concerning Transmittal of International Preliminary Report on Patentability (Chapter I of the Patent Cooperation Treaty), in English, dated Jul. 14, 2022, which was issued by the International Bureau of WIPO in Applicant's corresponding international PCT application having Serial No. PCT/EP2020/087953, filed on Dec. 29, 2020.

(Continued)

*Primary Examiner* — Tuan V Nguyen
(74) *Attorney, Agent, or Firm* — Bodner & Bodner, PLLC; Christian P. Bodner; Gerald T. Bodner

(57) ABSTRACT

The invention relates to a novel multivalent atrial appendage occluder of hybrid design based on two different atrial appendage occluders, one having a proximal disk-shaped cover and a second version without a proximal cover. The two occluder variants each provide relevant application solutions by themselves. The invention further relates to multiple specified, universal devices composed of predominantly rotationally symmetrical individual parts for produc- (Continued)

Figure 17:
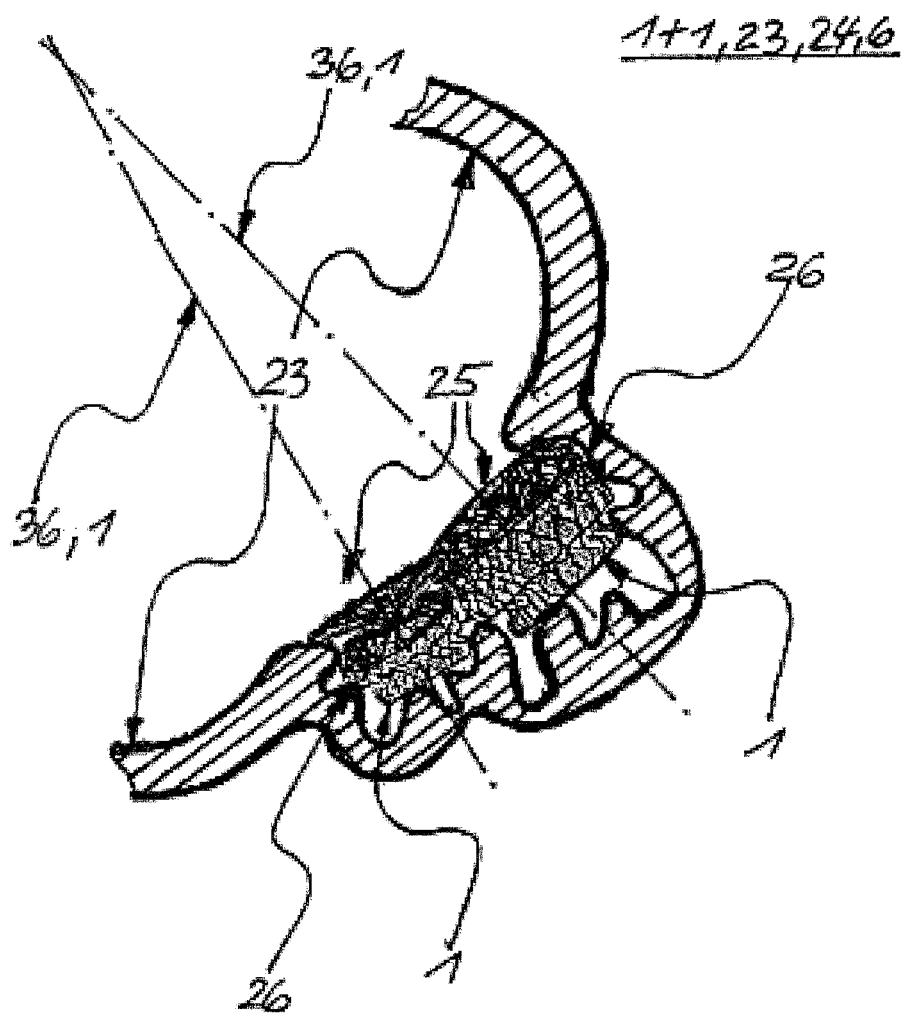

ing these different LAA occluders (LAA=Left Atrial Appendage) which are graded in different sizes, for the interventional, catheter-based closure of the left atrial appendage. Axially and radially oriented hooks support the secure and gentle anchoring of the occluders 1 in the retaining area of the atrial appendage 26. As a result, the use of substantially smaller access ports in the interventional application is possible. The two atrial appendage occluder variants, with and without proximal cover 14, can be inserted using the same controllable access port and can be implanted in various sizes individually or in combination with one another and likewise as a hybrid variant of two occluders, one without a proximal cover (14) and one subsequently with a proximal cover (14) in one and the same atrial appendage (24) as shown in FIG. 17. The two atrial appendage occluder variants can each be released during the implantation phase in three stages until they are fully unfolded.

12 Claims, 17 Drawing Sheets

(52) U.S. Cl.
CPC ............... *A61B 2017/00004* (2013.01); *A61B 2017/00526* (2013.01); *A61B 2017/00871* (2013.01); *A61B 2017/12095* (2013.01)

(58) Field of Classification Search
CPC .... A61B 17/12109; A61B 2017/00526; A61B 2017/12095
See application file for complete search history.

(56) References Cited

FOREIGN PATENT DOCUMENTS

| EP | 2074953 A1 | 7/2009 | ............. A61B 17/00 |
| WO | WO 2016155847 A1 * | 10/2016 | |
| WO | WO2018069523 A1 | 4/2018 | ............. A61B 17/12 |

OTHER PUBLICATIONS

The English translation of the International Preliminary Report on Patentability (Chapter I of the Patent Cooperation Treaty), dated Jul. 5, 2022, which was issued by the International Bureau of WIPO in Applicant's corresponding international PCT application having Serial No. PCT/EP2020/087953, filed on Dec. 29, 2020.

The Written Opinion of the International Searching Authority, in English, dated Apr. 20, 2021, which was issued by the International Bureau of WIPO in Applicant's corresponding international PCT application having Serial No. PCT/EP2020/087953, filed on Dec. 29, 2020.

The International Search Report, in English, dated Apr. 20, 2021, which was issued by the International Bureau of WIPO in Applicant's corresponding international PCT application having Serial No. PCT/EP2020/087953, filed on Dec. 29, 2020.

An Office Action (in German), dated Oct. 15, 2021, issued by the German Patent Office for Applicant's corresponding German Patent Application No. DE102020003145.5, filed May 18, 2020.

* cited by examiner

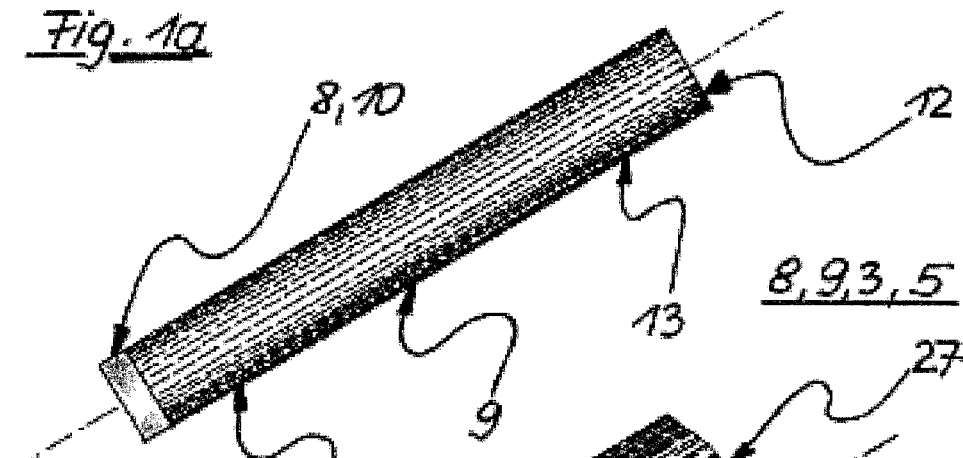
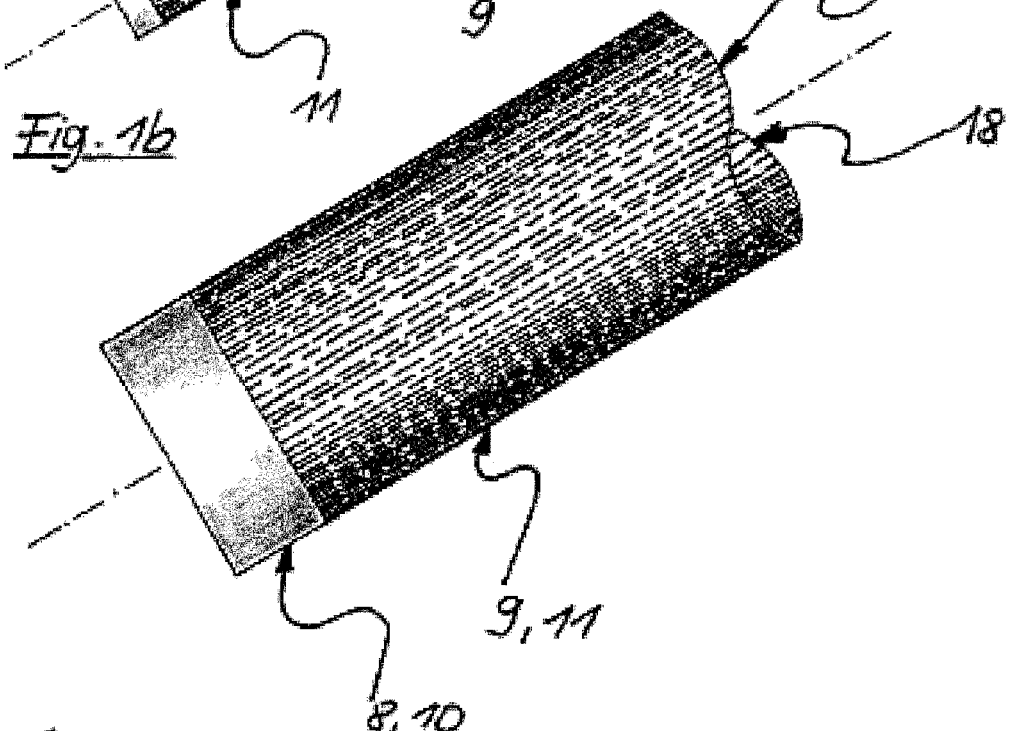
Fig. 1(a-b)

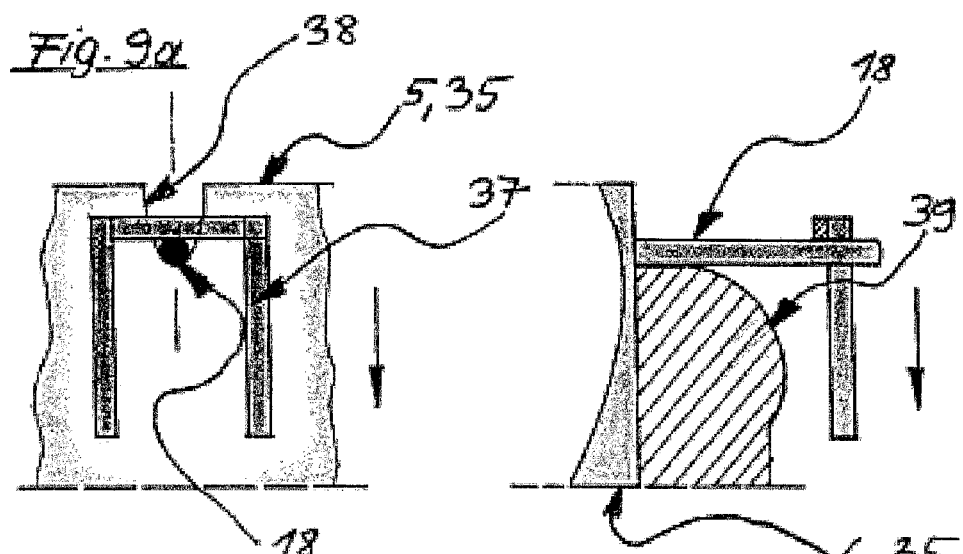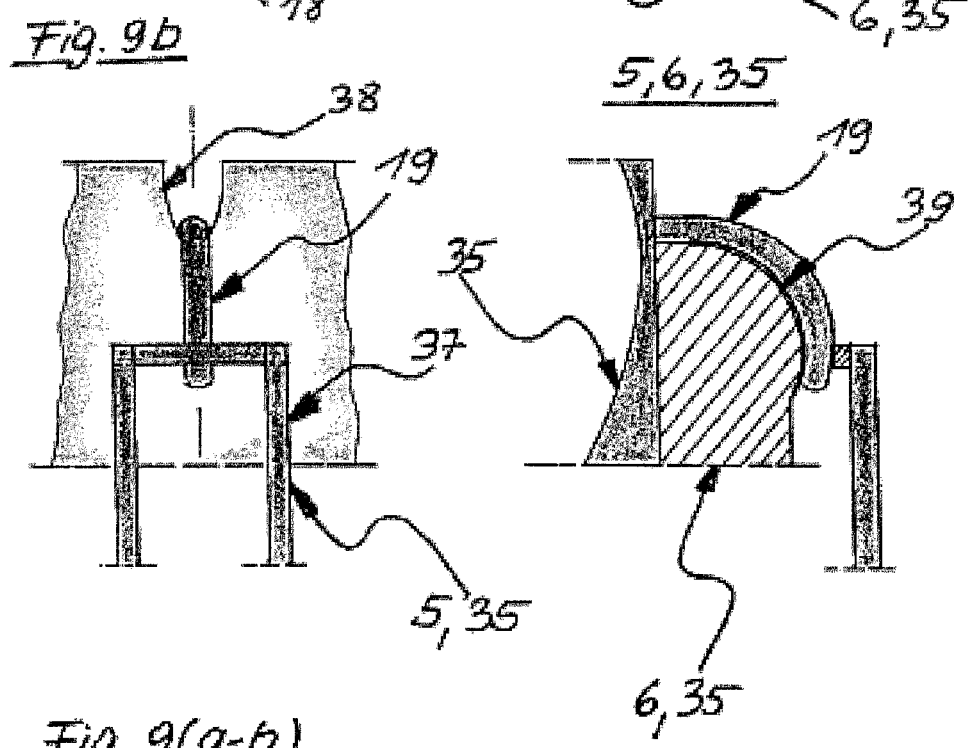

Fig. 15 (a-b)

ATRIAL APPENDAGE OCCLUDER FOR CLOSING THE LEFT ATRIAL APPENDAGE

The invention relates to a novel multivalent atrial appendage occluder of hybrid design based on two different atrial appendage occluders, one having a proximal disk-shaped cover and a second version without a proximal cover. The two occluder variants provide relevant application solutions to themselves.

The invention further relates to multiple specified, universal devices composed of predominantly rotationally symmetrical individual parts for producing these different LAA occluders (LAA=Left Atrial Appendage) which are graded in different sizes, for the interventional, catheter-based closure of the left atrial appendage.

These LAA occluders manufactured from the devices embody a network of grid-shaped stent-shaped elements lasered from a metal tube (nitinol), the final configuration of which as a closing device of the left atrial appendage receives a suitable formation by means of a transformation and heat treatment process and is put forward in an elongated shape into the cardiovascular system through a catheter. Upon exiting from the catheter tip, this device adopts its predetermined shape in the atrial appendage and is anchored at the place of destination and "released" after checking the correct position and location. In the course of a few weeks, the implant will grow in, wherein it is overgrown by endogenous endothelial cells. On this occasion, the catheter previously inserted from the right lingual vein into the right atrium needs to be conducted into the left atrium through a transseptal punction of the atrium septum. The occluder developed here has self-centering properties. Membranes are situated along the longitudinal axis in the center and on the distal end, so that the LAA occluder may adapt to the shape of the atrial appendage in an optimum manner, and in particular at the transition of the proximal to the distal retention areas, axially and radially oriented small hooks are present, which, on the one hand, lead to securely anchoring the occluder in the left atrial appendage, and, on the other hand, practically exclude the risk of the pericardium to be perforated.

Only this universal device according to the invention enables the small hooks to be axially and radially oriented at the same time, which in turn enables very small catheter or port diameters to be used and thus leads to gentle treatment.

For specially shaped, very open atrial appendages, two of such atrial appendage occluders may also be used in combination. In the combined use of both hybrid variants, first the atrial appendage occluder without proximal cover needs to be implanted.

BACKGROUND OF THE INVENTION

The heartbeat is induced by regular electrical impulses having heir origin in the sinus node of the heart. In the case of atrial fibrillation, the periodic impulse is superimposed and disturbed by unorganized impulses starting from the roots of the pulmonary veins in the heart muscle. While in many cases asymptomatic, this kind of cardiac arrythmia may also be noticeable as palpitations, syncopes or breast pains.

Atrial fibrillation is classified into subgroups:
paroxysmal atrial fibrillation (converts spontaneously in to the sine rhythm after occurrence)
persistent atrial fibrillation (atrial fibrillation existing over more than seven days; is accessible to therapy)
permanent atrial fibrillation (existing permanently and therapy-resistant atrial fibrillation)

Available long-term data show that 20 years after the diagnosis, episodes of paroxysmal atrial fibrillation occur only in 2 up to 3% of all patients. In the large majority of up to 98% of all patients, the progression of the disorder finally leads to permanent atrial fibrillation.

A second classifying scheme is based on the cause of arrythmia:
valvular atrial fibrillation: starting from the mitral valve or mitral valve insufficiency conditioned by atrial fibrillation
non-valvular atrial fibrillation: starting from other causes (e.g., high blood pressure The non-valvular atrial fibrillation (NHF) is the most common form of an arrythmia having an incidence of 1 to 2% in the entire population. This portion will presumably rise in the next 50 years due to demographic changes, since the incidence increases with the age. Likewise, the prevalence for typical diseases increases with increasing age, which favour the non-valvular atrial fibrillation (in the following abbreviated by VHF), such as diabetes, high blood pressure and coronary heart diseases. In a typical Caucasian population group, 0.5% of all the people in the age group from 40 to 50 years, and 5 to 15% of all people on the age group over 80 years are concerned. Men are concerned to a higher extent than women of the same age group.

The left atrial appendage is a muscle pouch adjoining the left atrium of the heart. It serves as a developing tissue and reservoir for the atrial natriuretic peptide (ANP). Furthermore, the physiological function of LAA is still extensively misunderstood.

In patients having VHF, thrombi were discovered in over 90% of the cases within the LAA by post-mortem examinations and by echocardiographical diagnoses. As a part of the cardiac muscle, the LAA is actively contracted and emptied. In the case of VHF, the blood flow is decelerated within this appendix up to stasis, having an increased probability of thrombus formation. In the anatomic view, the crypt-rich structure of the individual LAA is formed from one to three lobe/s, is highly diverse and offers an ideal surrounding for thrombus formation caused by the trabecular structure of the inner wall of the atrial appendage in contrast to the smooth inner wall of the remaining left atrium. When released into circulation, thrombi formed there can result in ischemia in the brain or other organs such as the kidneys.

Ischemic stroke is characterized by a rapid loss of neurological functions due to the interruption of the blood supply of concerned brain areas. The supply deficit is caused by a thrombus or cerebral bleeding.

In industrialized countries, 80% of all strokes are caused by cerebral ischemia due to thrombus-induced arterial occlusion. In parallel to the VHF risk, the risk of stroke also increases with the age. Unsurprisingly, epidemiological studies identified the fact that VHF is a stroke risk, too.

Accordingly, more than 20% of all strokes in concerned persons over 80 years can be ascribed to VHF. Likewise, the VHF-associated stroke is characterized by higher mortality and morbidity as compared to strokes without the presence of VHF (Landmesser U and Holmes DR, 2012). In each case, a stroke is a medical emergency which can cause heavy, permanent neurological function failures up to death.

The scoring system $CHADS_2$ ("$CHADS_2$ Score") is used as a simple aid so as to calculate the stroke risk of individual patients by means of simple diagnostic and demographic parameters. Approaches for preventing and therapying result therefrom. In the recent years, this score was expanded by newly identified risk factors to the Score $CHA_2DS_2$-VASc. Two ore more scores result in a higher risk for a stroke. In these cases, the European Society of Cardiology recommends oral anticoagulation.

A new version of the guideline of the European Society of Cardiology for treating VHF, published in 2012, includes a recommendation of class IIb (based on expert consent) for taking into account the LAA occlusion in patients having a contraindication to oral coagulation.

Likewise, the British NICE ("UK National Institute for Health and Care Excellence") considers the percutaneous LAA occlusion as an option for stroke prevention in the case that oral anticoagulation is contraindicated or there is an incompatibility (National Institute for Health and Care Excellence, 2014, August: Atrial fibrillation: the management of atrial fibrillation—NICE clinical guideline 180). Already in 2011, the EHRA ("European Heart Rhythm Association") wrote a position paper recommending the percutaneous LAA occlusion as an option in patients having a contraindication to oral anticoagulation. It is just in patients having preceding episodes of intracranial bleeding, that stroke prophylaxis without long-term oral anticoagulation is desired.

Stroke prevention is based on oral anticoagulation by vitamin K antagonists (Warfarin, mainly used in the USA, and Phenprocoumon, preponderantly employed in Europe) as well as in the meantime also by newer medicaments. The use of thrombocyte aggregation inhibitors based on acetyl-salicylic acid as a monotherapy or in combination with Clopidogrel, is less effective but associated with the same risks as the oral anticoagulation. These include heavy bleedings and/or intracranial bleedings. Thus, the thrombocyte aggregation inhibition should be limited wherever possible. The classical oral coagulation, such as, e.g., the use of Warfarin, has a narrow therapeutical window, is characterized by considerable drug interactions and increases the risk of intracranial and gastrointestinal bleedings in particular in elder patients. Newer preparations such as Dabigatran Etexilate, Rivaroxaban and Apixaban only show a slightly reduced risk of intracranial bleedings as compared to Warfarin. This is why there exists a substantial bleeding risk despite of the better risk profile. Likewise, these preparations are not intended for continuous medication. For this reason, oral coagulants are only prescribed in a restrained manner. A further problem is the insufficient monitoring of patients with respect to an effective dosage. A study showed that 44% of the patients only reached a subtherapeutic level of active ingredients, and 19% of the patients reach a supra-therapeutic level of active ingredients. Furthermore, continuous medication with oral anticoagulants is in advance contraindicated in 14 to 44% of all VHF risk patients. This applies preponderantly to elder people, in which the risk of stroke complementarily is highest. A equally important weighting factor complicating pharmacological therapy is the deficient treatment adherence of the persons concerned. Intaking oral anticoagulants means a deep incision into the familiar lifestyle.

Stroke prevention by an open, surgical occlusion or an excision of the LAA is complicated by high rates of only incompletely closed LAAs after intervention. These are 10 to 80% depending on the surgeon's method and experience. The highest rate of success shows in this case the LAA excision, and the lowest rate of success has the seam or clamp occlusion (Guerios EE et al., 2012). The seam technique used here, however, is very important. The seam from "inside", wherein the LAA is sewed up from the left atrium, surely has to be preferred here. Better data will be shown by the study LAAOSIII to be published in the near future.

A valid prevention option for patients having a contraindication to oral anticoagulation or other conditions preventing conservative or surgical therapy, is the percutaneous occlusion by means of so-called LAA occluders. Transcatheter techniques allow for percutaneous access to the LAA and the use of these medical products which are usually made of expandable nitinol networks.

Thereby, the LAA cavity is excluded from blood circulation and thrombus formation is prevented. After a certain time, fresh endocardial tissue is formed on the occluder. These processes should theoretically decrease the risk of stroke.

A challenge is the correct size selection of the intended occluder. This must be fitted precisely into the ostium of the LAA. The LAA must be occluded as well as possible. A study, which analysed the LAA anatomy of 612 patients by means of CT imaging, resulted in an extremely complex and heterogenous anatomy which complicated each individual adaptation. A wrong size determination and adaption in the one or the other direction causes problems.

An occluder selected too small allows residual leakages. An occluder selected too big may result in compression of the adjacent coronary artery (in particular the Ramus circumflexus).

STATE OF THE ART

At present, there are two prevailing prototypical LAA occluders available on the market:
the Amplatzer Cardiac Plug (ACP) as well as the successor system Amplatzer Amulet (St. Jude Medical, St. Paul, MN, USA)
the Watchman LAA system as well as the successor Watchman FLX (Boston Scientific Natick, MA, USA)

A survey carried out by Pison and colleagues in 24 European centres revealed that 7 centres (29%) exclusively used the Watchman, and 8 centres exclusively implanted the Amplatzer (33%). In nine centres, both of the products were used (38%). With respect to their clinical employment, the principle of application, the materials used and the method of implantation, both products are to be considered as being equivalent. Complications associated with the application of the occluder decrease with the increasing experience of the surgeon. A comparing study showed that the learning curves improved for both products irrespective of which initial experiences have been collected with the two occluder types. From the side of the application, both occluders therefore have to be considered as being equivalent. All the same, there are differences discussed in literature. Rodes-Cabau and colleagues especially highlight the simple handling and the correction possibilities of the ACP in case of an initial misplacement. Montenegro and colleagues also report that misplaced occluders or occluders having incorrectly selected dimensions could be retrieved and exchanged without complications. Lam and colleagues also discussed in particular the design advantages of the ACP as compared to other regularly used occluder types holding the risk of residual throughflows by inherent design features. The Watchman is made of a nitinol framework which is covered with tissue and has a combined sealing and anchoring function.

Over the time and with grown experience it became clear that the highly variable, individual anatomy of an LAA represents an important challenge for the size selection of the occluder and the implantation thereof. The challenge was met with the Amplatzer Amulet, the ACP successor. The Amulet includes modifications to the proven ACP design, however, without changing it substantially. These modifications facilitate implantation and minimize the risk of complications.

These occluding devices have quality deficits:

In these occluders, very painful irritations of the pericardium may arise by bulging of the left atrial appendage as a consequence of friction with the pericardium. The hooks used for fastening the occluders in turn may cause the pericardium to be perforated; moreover, the thrombus formation risk of the occluders is relatively high due to the coupling partly protruding widely into the left atrium at the proximal end of the occluders; in the WATCHMAN device, localization problems arise in addition. Finally, the devices also have the disadvantage that the catheter, due to its positioning in the left atrium is at an unfavourable angle relative to the position of the occluder in the final position in the left atrial appendage with respect to the direction of its longitudinal axis (both axes are almost rectilinear to one another), which leads to considerable obstructions in the course of implantation, and may also lead to the left pericardium to be perforated by perforating the wall of the left atrial appendage.

These problems were better solved by the flexible system of the modular occlusion device for occluding the left atrial appendage by means of the Acoredis device, PCT EP2015/069423, and the Cosmos Medical device, PCT EP2017/076240. However, the "intelligent" hooks indicated in the latter mentioned publication lead to the fact that only relatively large catheters can be inserted, which is in particular disadvantageous in the adult cardiology in female patients. Moreover, it cannot be excluded that these hooks are wedged when the occluders are inserted into the loading space and the perfect function thereof is not completely secured later when the occluder is released.

Formulated Tasks

The task of the invention is to avoid the disadvantages described to the state of the art, and to achieve in particular an implantation process that is to be manipulated easily and has a secure implantation completion by means of such an LAA occluder. Moreover, the use of smaller catheters leads to more gentle treatment of the patients.

In the present invention, heat treatment devices are used by means of which LAA occluders lasered from a metal tube can be manufactured, which are self-centering and adopt an optimum fixed position in various configuration sizes after the interventional insertion. The basic shape of such an occluder resembles a cylindrical body having rounded edges and a diaphragm situated in addition in the middle and further diaphragms situated at the distal end. Instead of a sphere-like coupling, a coupling having an internal thread was integrated into the proximal end.

The small hooks intended for securely anchoring the LAA occluders in the left atrial appendage, are axially and radially oriented by the application of these special devices, so as to achieve, apart from an optimum function, a secure and gentle placement of the occluder in the retention area of the left atrial appendage as well as to enable smaller catheters to be employed.

The occluder is lasered from a nitinol tube to the greatest possible extent. Apart from the laser machining of the nitinol tube up to the final shape, appropriate heat treatment processes are used by means of these special devices, so as to fully exploit by means of targeted partial or intermediate processing steps the super-elastic material properties of nitinol (a titanium-nickel alloy, which is about 70 times more elastic than steel). In such an intermediate step that can be used multiple times, the occluder blank is introduced in one treatment step in several pre-devices, intermediate devices or final devices into a heat furnace, and is to be maintained there at a temperature of 350 to about 600 degrees Celsius for about half an hour up to three minutes. High temperatures enable low heat treatment times. After each heat treatment step, the device including the occluder situated therein is to be cooled relatively rapidly, for example by means of correspondingly tempered air or liquid nitrogen. Equally within the scope of the heat treatments steps, the occluders to be manufactured may be introduced into a tempered, appropriate molten salt at about 470 to 550 degrees, the retention times of about 5 to 1 minute/s being considerably lower due to the immediate and intense contact with the melt.

For securely anchoring the occluder, a certain number of small hooks is situated in the proximal retention area of the occluder. About seven times of the tube diameter of the initial tube is reasonable: at a tube diameter of 3 mm, this results in 21 hooks.

The small hooks will only be effective when the occluder is released within the atrial appendage and a corresponding compression force acts upon the outer envelope of the occluder via the bearing stress, which compresses the occluder by 3 to 10%.

For sealing the blood flow between the left atrium and the left atrial appendage, several plies of patches are incorporated, for which purposes DACRON has been used for many years. DACRON is a registered trademark of the manufacturer DuPont for fiber material of the polyester polyethylene terephthalate (PET).

EXEMPLARY EMBODIMENT

Figure 2:
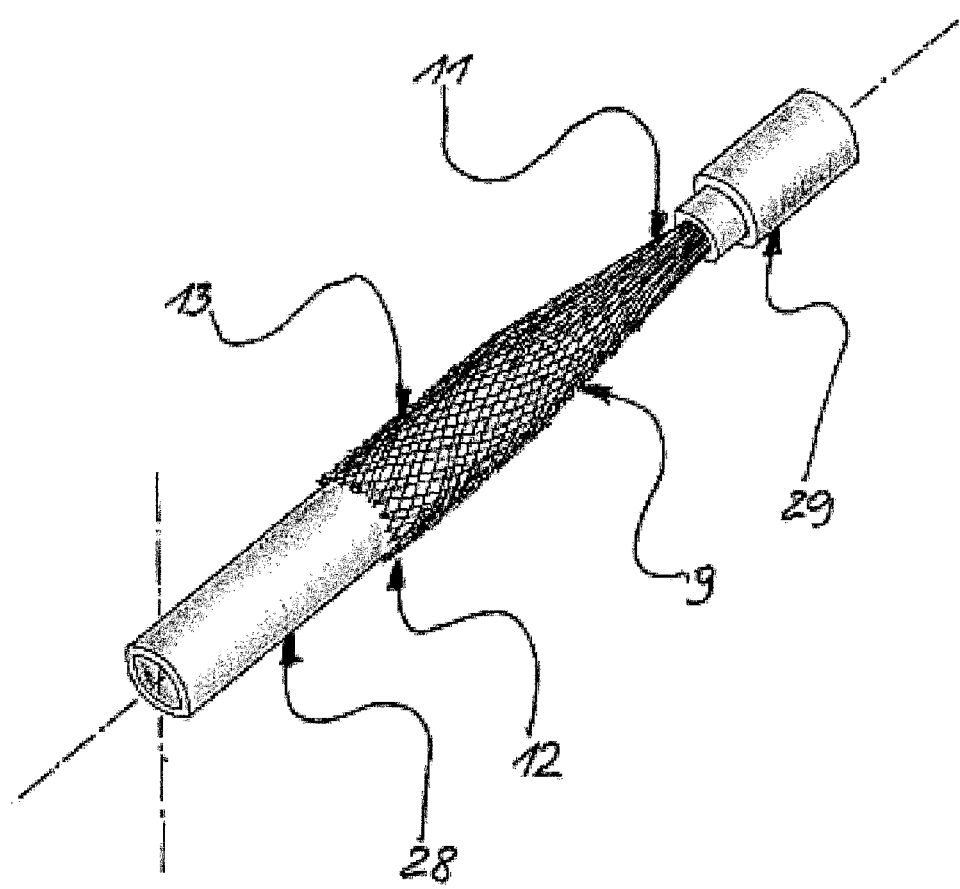
Figure 3:
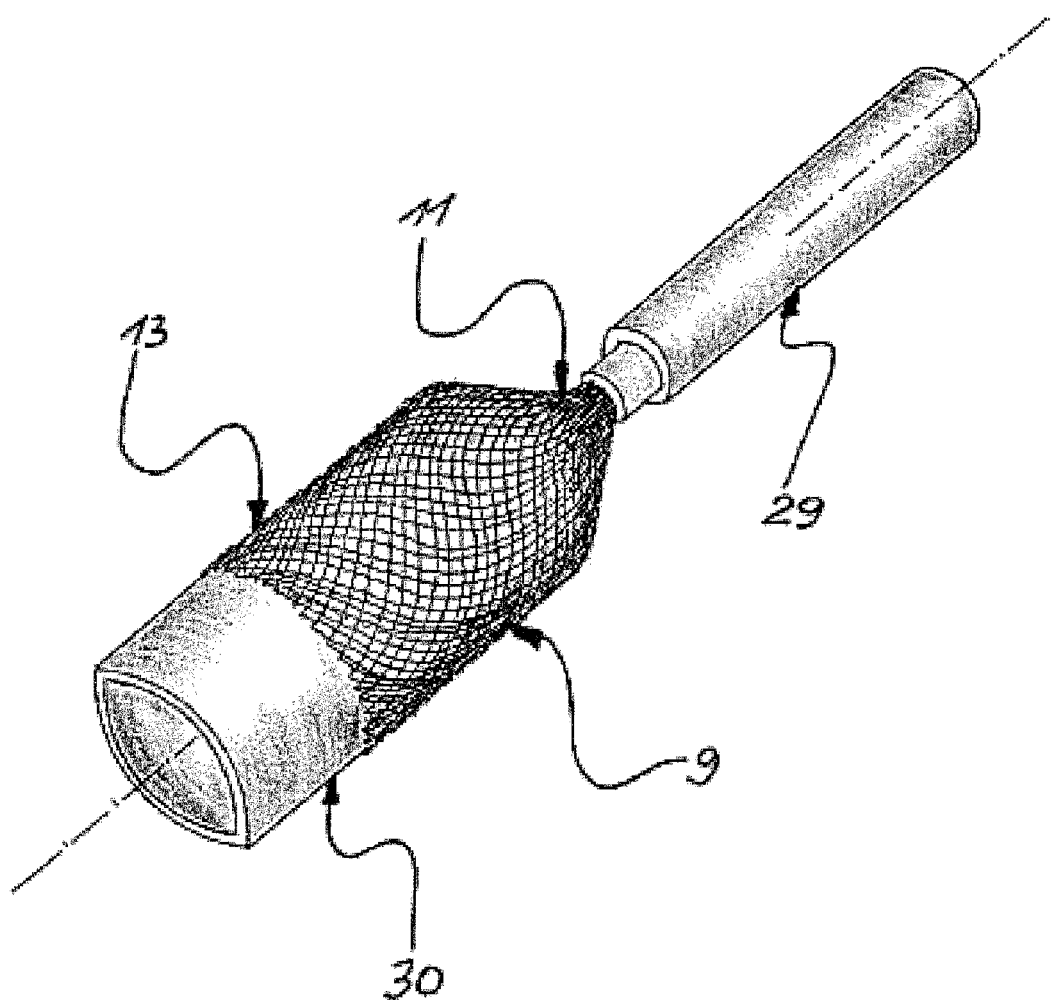
Figure 4:
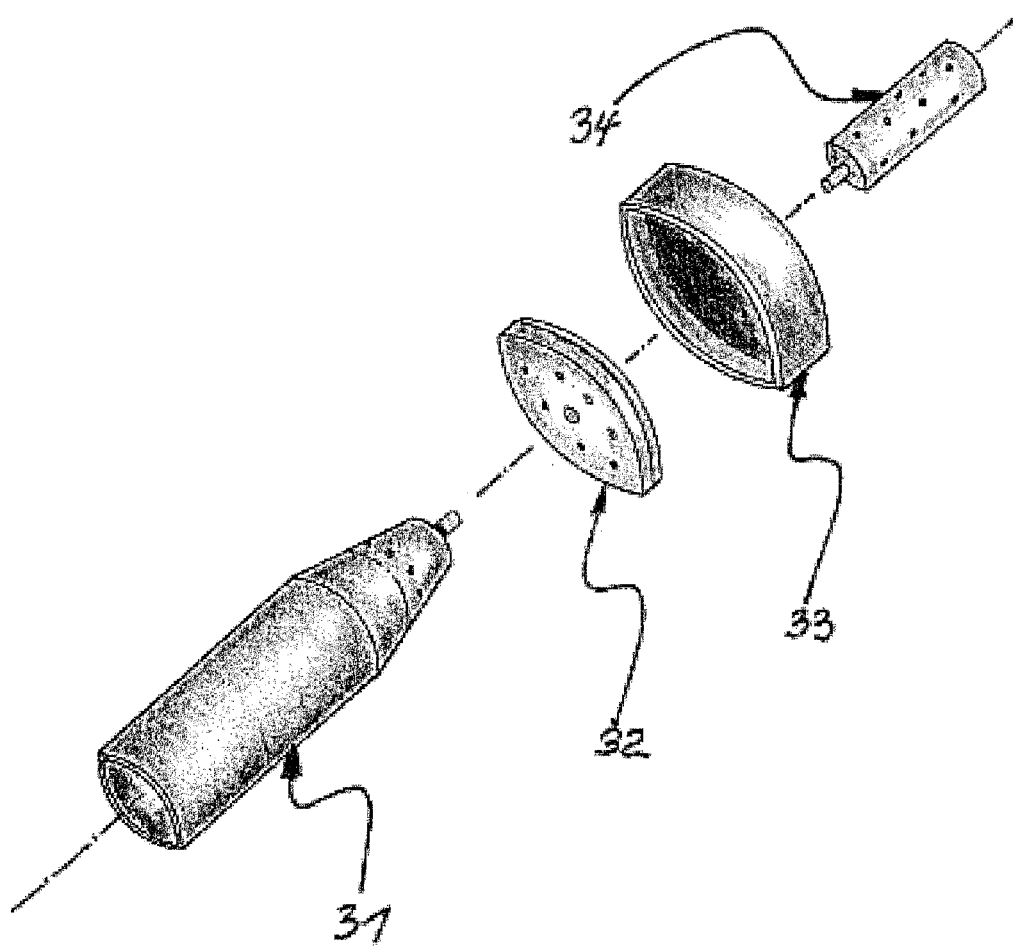
Figure 5:
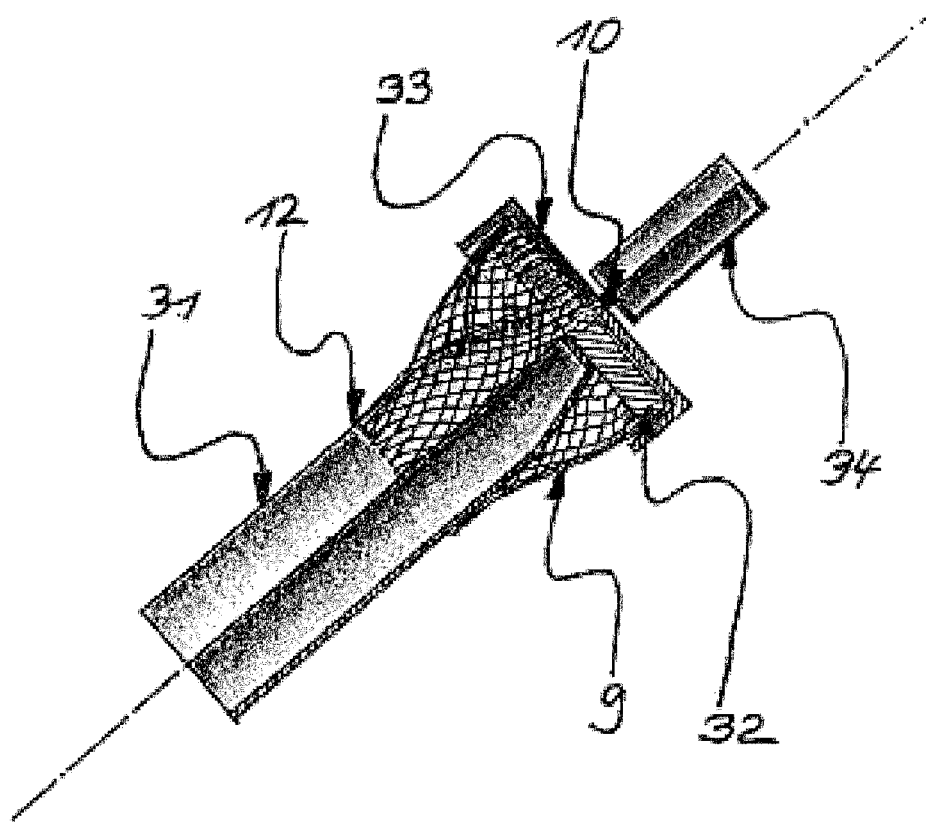
Figure 6:
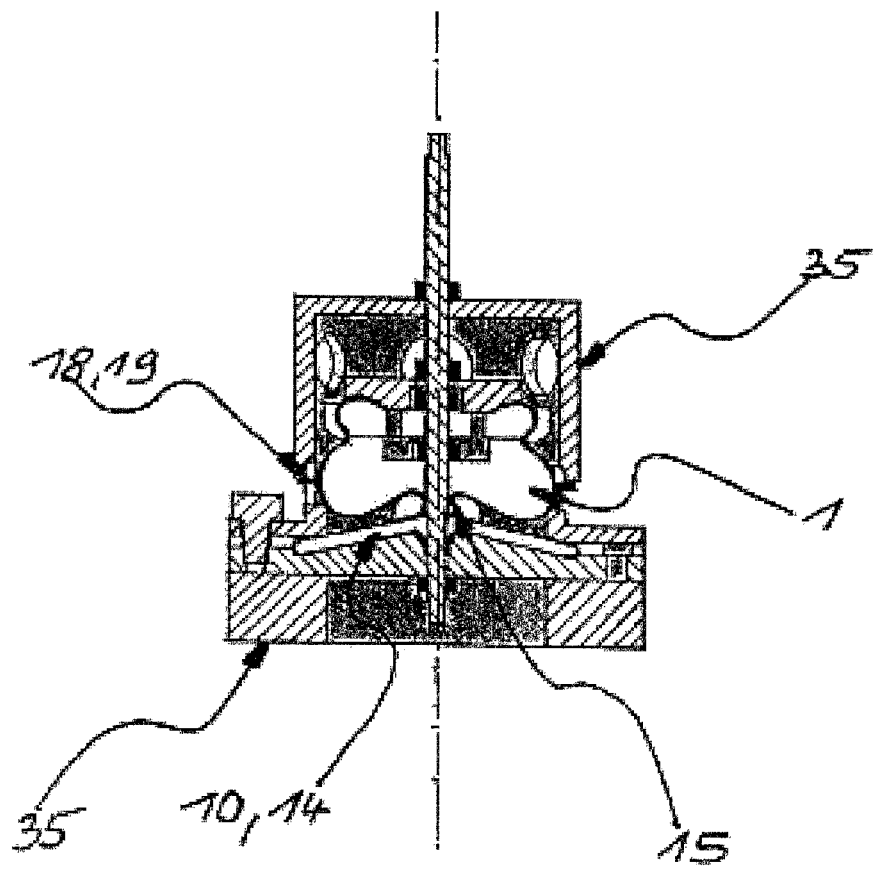
Figure 7:
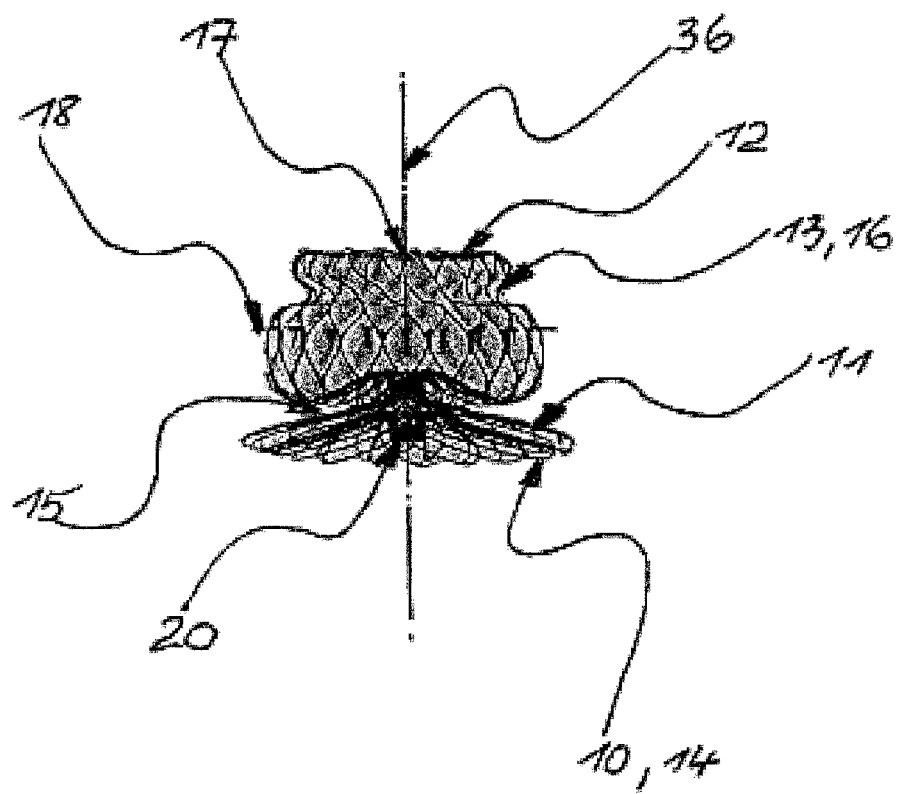
Figure 8:
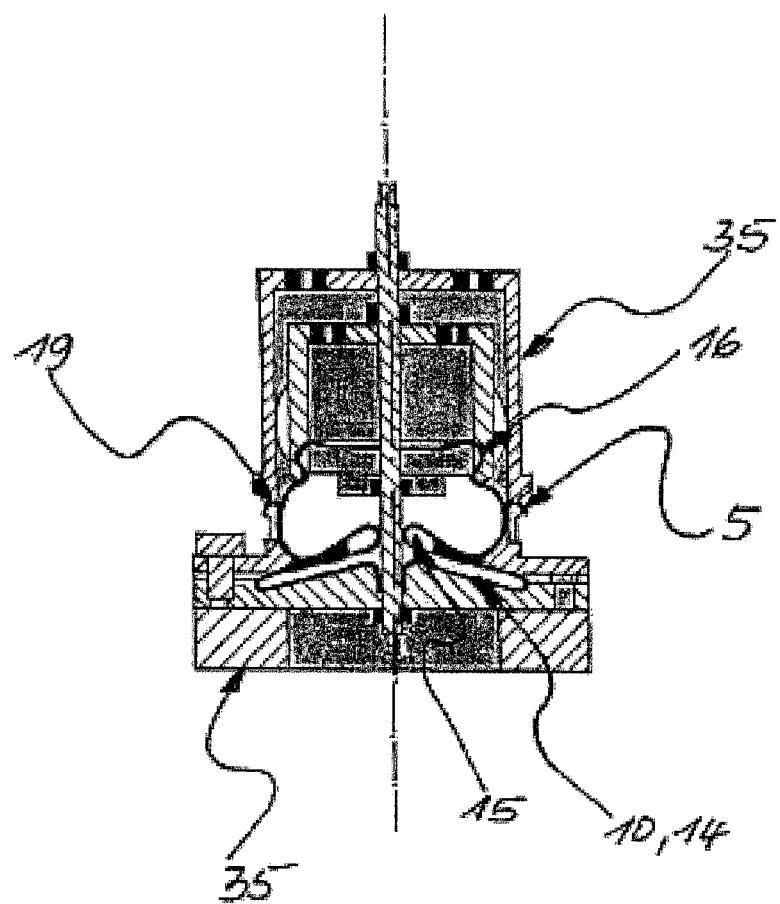
Figure 10:
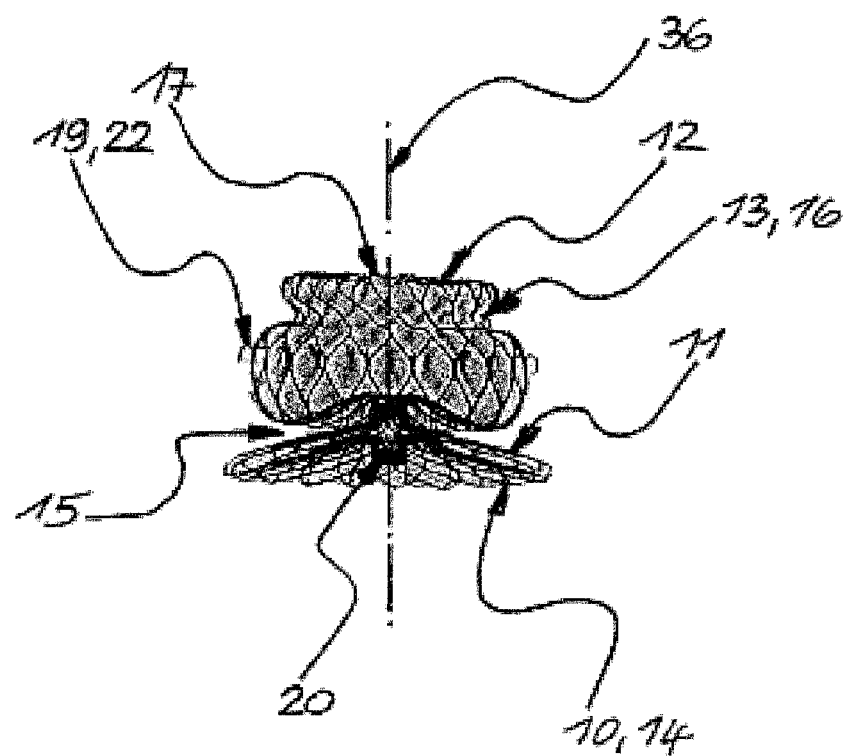
Figure 11:
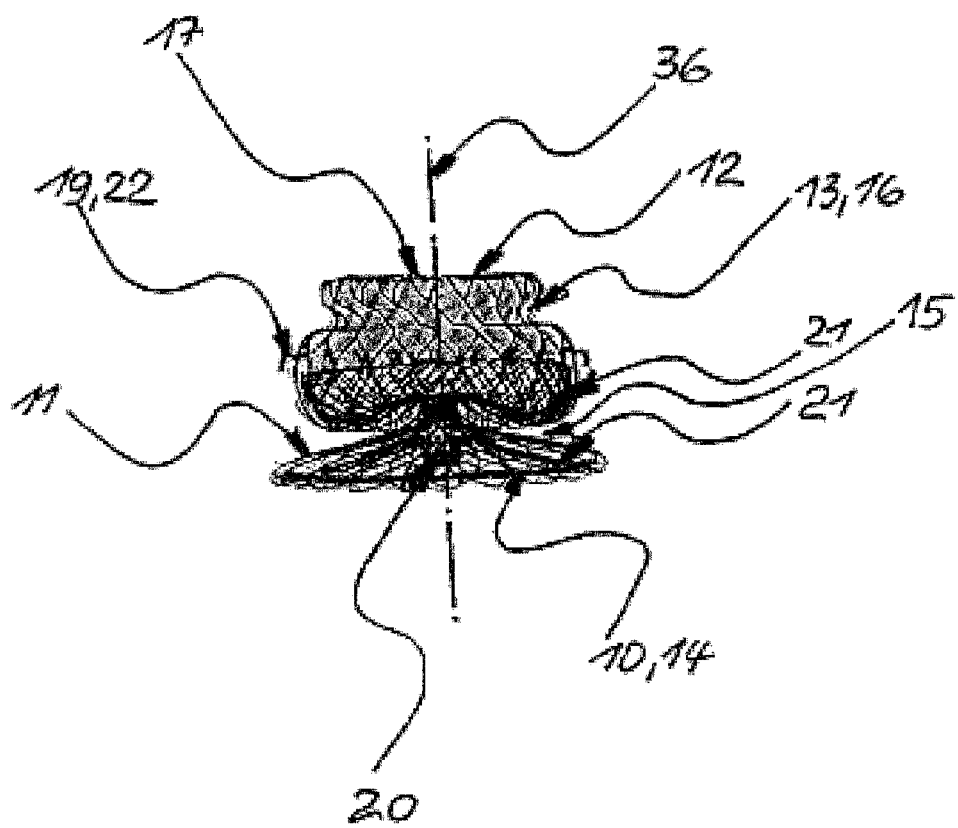
Figure 12:
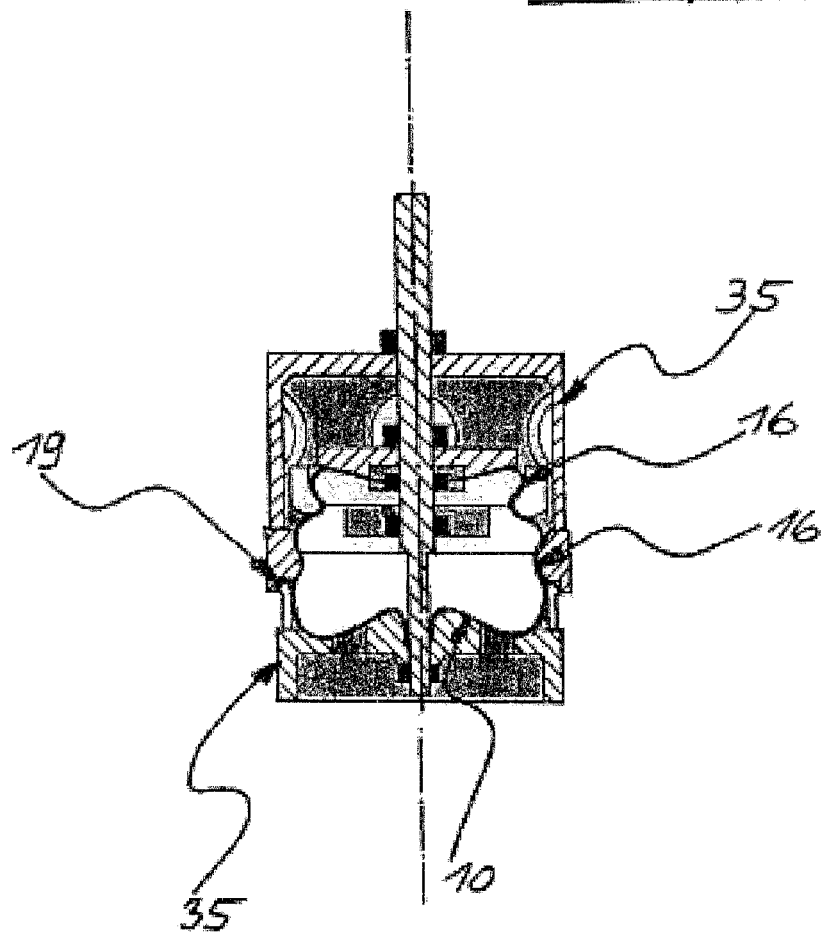
Figure 13:
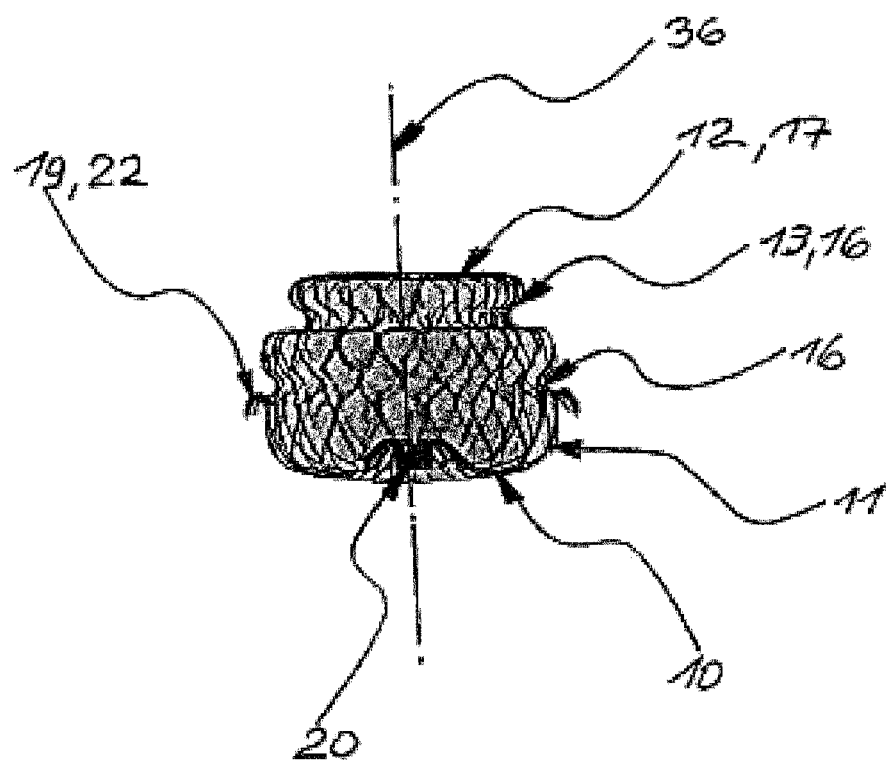
Figure 14:
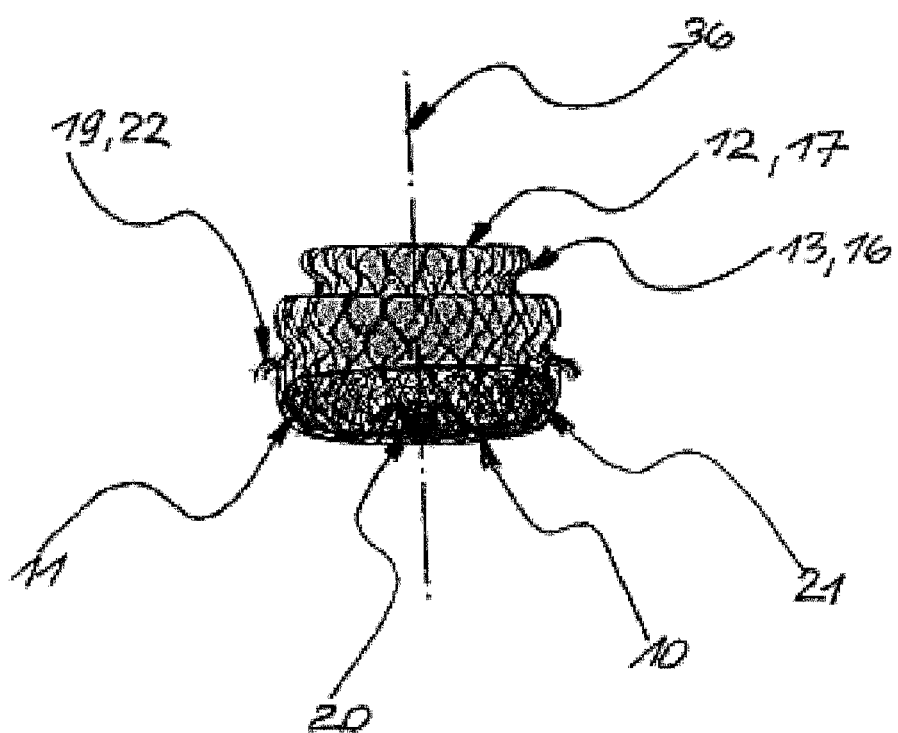
Figure 15A:
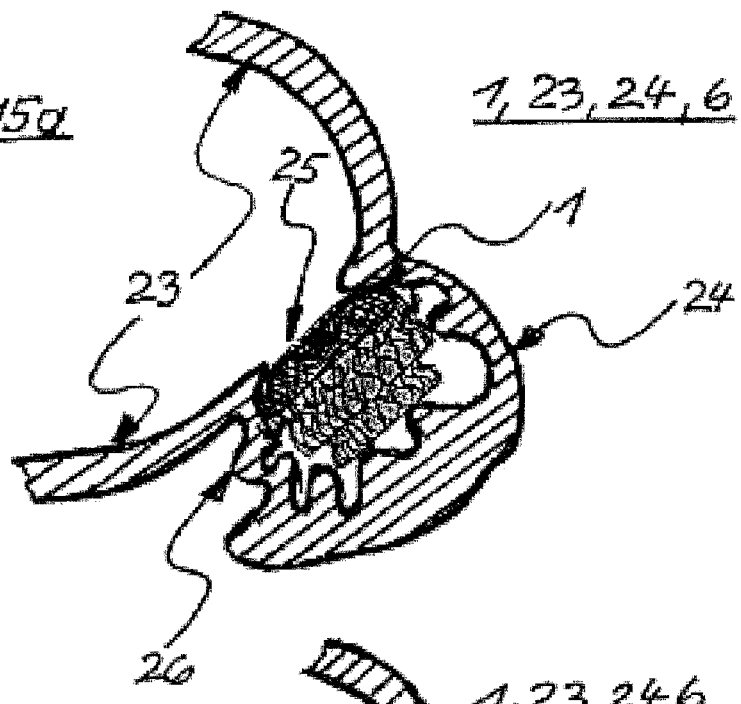
Figure 15B:
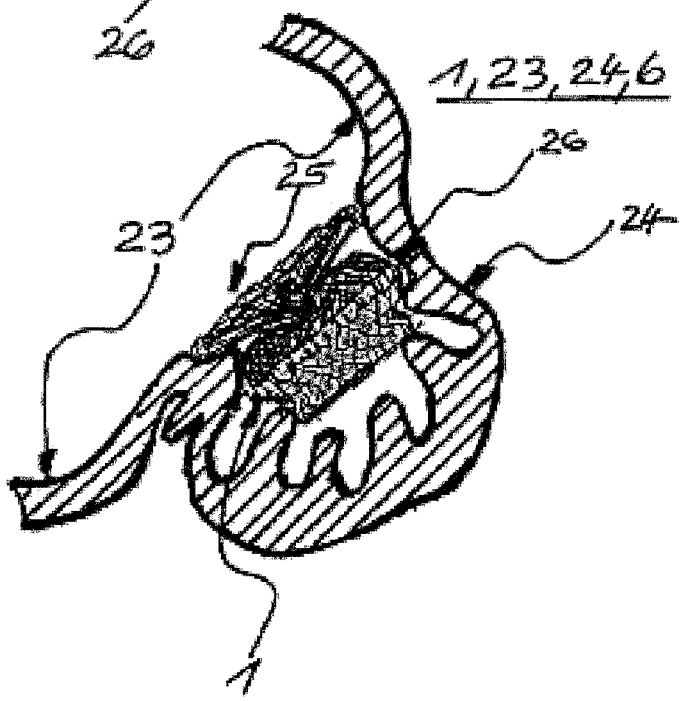
Figure 16:
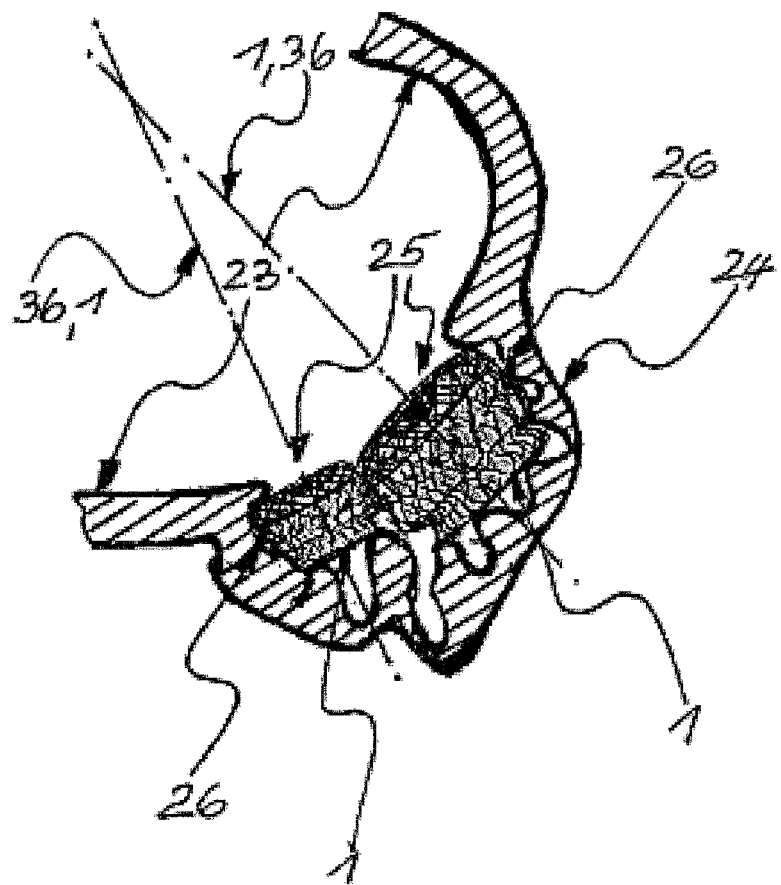

In the following, preferred exemplary embodiments of the occluders according to the invention and the devices thereof for producing such occluders having axially and radially oriented small hooks are explained in more detail on the basis of drawings. In this case, the features mentioned in the claims and the description each may be essential to the invention alone or in any combination. Shown are in:

FIG. 1(a) a schematic representation of the side view of a base body of the occluder according to the invention required for the first step of the gradually formative heat treatment;

FIG. 1(b) a schematic detail representation of the side view of the base body according to FIG. 1(a) an occluder according to the invention to be manufactured;

FIG. 2 a schematic representation of a spatial view of an occluder according to the invention to be manufactured having a device, during a first step of heat treatment;

FIG. 3 a schematic spatial representation of an occluder according to the invention to be manufactured having a device during a second step within the scope of the heat treatment;

FIG. 4 a schematic representation of the side view of a further device for the next step of the formative heat treatment for an occluder according to the invention to be manufactured;

FIG. 5 a schematic representation of the side view of an occluder according to the invention to be manufactured in a further step of the heat treatment with the support of the device according to FIG. 4;

FIG. 6 a schematic sectional representation of the heat treatment device having an occluder according to the invention to be manufactured with a proximal cover in the penultimate working step of the heat treatment;

FIG. 7 a schematic representation of a side view of an occluder according to the invention to be manufactured with a proximal cover after the heat treatment by means of the device according to FIG. 6;

FIG. 8 a schematic sectional representation of a heat treatment device having an occluder according to the invention to be manufactured with a proximal cover in the last working step of the heat treatment;

FIG. 9(a) a schematic detail view of the heat treatment device with a sectional representation for forming and radially orienting prior to the last step of the heat treatment of an occluder according to the invention to be manufactured with a proximal cover;

FIG. 9(b) a schematic detail view of the heat treatment device with a sectional representation for forming and radially orienting after the last step of the heat treatment of an occluder according to the invention to be manufactured with a proximal cover;

FIG. 10 a schematic side view of an occluder according to the invention to be manufactured with a proximal cover after the last step of the heat treatment according to FIG. 9(a-b);

FIG. 11 a schematic side view of a finally manufactured atrial appendage occlude according to the invention with a proximal cover;

FIG. 12 a schematic sectional representation of the heat treatment device having an occluder according to the invention to be manufactured without a proximal cover in the least step of the heat treatment;

FIG. 13 a schematic side view of an occluder according to the invention to be manufactured without a proximal cover after the last step of the heat treatment according to FIG. 12;

FIG. 14 a schematic side view of a finally manufactured atrial appendage occluder according to the invention without a proximal cover;

FIG. 15(a) a schematic sectional representation of the left atrial appendage having an implanted atrial appendage occluder according to the invention without a proximal cover according to FIG. 14;

FIG. 15(b) a schematic sectional representation of the left atrial appendage having an implanted atrial appendage occluder according to the invention with a proximal cover according to FIG. 11;

FIG. 16 a schematic sectional representation of the left atrial appendage having two implanted atrial appendage occluders according to the invention without proximal covers according to FIG. 14; and FIG. 17 a schematic sectional representation of the left atrial appendage having a hybrid application of an implanted atrial appendage occluder according to the invention with a proximal cover according to FIG. 11, and of an implanted atrial appendage occluder according to the invention according to FIG. 14.

A preferred embodiment, according to the invention, of the occluder 1 according to FIG. 11 and FIG. 14 is preferably manufactured from a conventional metallic nitinol tube 8.

In a first laser processing step in FIG. 1(a-b), corresponding laser incisions 27 were made into the wall of a nitinol tube by means of an appropriate laser.

By predetermined, correspondingly shorter or longer laser incisions 27 and the therefrom resulting narrower, broader, shorter or longer form elements 18, the later final shape of the occluder 1 is already predetermined. In each case at the proximal end 10 of the nitinol tubes 8 processed by laser, a 1.5 to 2 mm short tube portion remains free from the laser production. Into this end pipe piece, a small inner cylinder having an M1 thread is inserted after the heat treatment, which, as a coupling 20, can receive an insertion wire having an external thread M1. In the subsequent heat treatment process, a tool mandrel 28 is first introduced into the distal end 12 of the lasered envelope 9 of the nitinol tube 8 in a first process step according to FIG. 2, which expands the laser processed envelope 9. The proximal end of the lasered envelope 9 and the short completion piece of the nitinol tube 8 are in turn situated in a tool reception 29 so as to ensure the axial orientation of the later final shape of the occluder 1 already in this early process step. The first partial step of the heat treatment process begins now in order to stabilize the first intermediate shape. Thereafter, the next process steps can be repeated, wherein in each further step of producing intermediate shapes further device parts are required. By way of example, by means of a larger second mandrel 30, the widened nitinol tube is still further widened according to FIG. 3 and then follows the heat treatment process etc. These process steps can be performed multiple times up to the final shape together with other specific working steps for further forming intermediate shapes while continuously taking into account the maintenance of the axial orientation. Molten salts are to be preferred for the heat treatment process due to the higher quality standards. Exemplary is also the following processing step according to FIG. 5 for producing the outer contour of the cover 14 at the proximal end 10 of an occluder 1 according to FIG. 14. By means of the device parts 31, tool mandrel 3, 32, intermediate plate 1, 33, covering 1 and 34 and fixing bolt according to FIG. 4, according to FIG. 5 the lasered envelope 9 is first pushed over the intermediate plate 1, 32, thereafter the tool mandrel 3, 31, and is mounted via the covering 1, 33 with the support of the fixing bolt 1, 34 and the tool mandrel 3, 31 at the other end. Thereto, a further heat treatment step follows for stabilising this intermediate shape. In FIG. 6, a schematic device 35 for the penultimate process step of the heat treatment of an occluder 1 according to FIG. 14 is illustrated. The hooks 19 and their repeated axial and simultaneously radial orientation are pre-fabricated for the last step of the heat treatment so that the occluder 1 pre-fabricated according to FIG. 7 having the later final shape according to FIG. 14, in which the hooks are still perpendicular to the middle axis 36, is achieved. This pre-fabricated occluder 1 according to FIG. 7 is now used for the final heat treatment in a further finally modified device 35 for the occluder 1 according to FIG. 14 for forming the simultaneously axially and radially oriented hooks 19. When the finally modified device 35 is professionally inserted and fixed in the final position, the detail view 5 according to FIG. 8 shows in the following schematic representation in FIG. 9(a-b) the final process step for forming the hooks and their forced radial orientation, which is permanently secured by the following heat treatment. The detail view 5 according to FIG. 9a shows in both of the left and right schematic representations a not yet shaped hook 19 as an elongated shape element 18. The two schematic representations of FIG. 9b show the detail view 5 of the finally modified device in the finally mounted state so as to perform the following heat treatment process: by means of a down-hold device 37, the hook 19 is pressed into the lowest position of the recess 38, and is held by the down-hold device 37 in this position until the last heat treatment step is completed. By means of the combination of the recess 38, the down-hold device 37 in conjunction with the form fit of the shape part 39 and the subsequent heat treatment, the exact shaping and radial orientation of the hooks 19 is finally successfully achieved.

After the last heat treatment by means of the device according to FIG. 8, FIG. 10 shows a blank of a finally fabricated occluder 1, into which a thread coupling having an internal thread M1 of nitinol is finally welded by means of laser welding. This is necessary so as to fasten later a screw wire having an external thread M1 for the later interventional implantation process. The blank of the occluder 1 is finally electro-polished, and, after diverse final cleansings by means of ultrasound and ultrapure water, two PET patches 21 or analogous patches 21 are inserted into the occluder 1 according to the function thereof, as is illustrated in FIG. 11. For this purpose, the two patches 21 are manually sewn in by using three commercial surgical yarns in each case, namely one patch 21 into the proximal cover 14, and a second patch 21 into the bulbous area of the occluder 1 immediately after the waist or web 15.

The heat treatment device 35 according to FIG. 12 is the equivalent to the device of FIG. 8. By means of this device 35, the occluder 1 is finally fabricated without a proximal cover 14 as illustrated in FIG. 13. This occluder 1 according to FIG. 13, however, requires according to FIG. 14 only one patch 21 for sealing the blood flow, as can be seen from FIG. 15b.

The finally fabricated and sterilised atrial appendage occluders 1 with and without a proximal cover according to FIG. 11 or FIG. 14 can now be used for the interventional stroke prophylaxis as required. The interventional atrial appendage closure is based on a venous, transseptal access, via which a self-expanding device is introduced into the left atrial appendage 24 according to fluoroscopic representation. Preoperatively, the patient is in this case treated with thrombocyte aggregation inhibiting substances or substances having an anticoagulating effect.

After the puncture of the Vena femoralis, the occluder 1 with the help of an insertion wire is pushed via the right atrium and after a transseptal puncture is advanced up into the left atrium 23 and is finally discharged in the left atrial appendage 24 from the port. In this case, the distal spherical body expands in the left atrial appendage 24, while the proximal cover 14 seals the atrial appendage inlet 25 from the outside. After checking the positioning in the LAA, the occluder can be disconnected from the feeder system. The entire procedure takes place under continuous TEE control, wherein the patient is in a mild narcosis (sleeping state, in which the respiratory and circulatory functions are kept to be stable). For avoiding thrombi, anticoagulants (medicament for haemodilution) need to be taken post-operatively, first for 24 hours. Up to the complete endothelialisation, an intake of 6 months of ASS and/or Clopidogrel is subsequently required. This is for the purpose of avoiding blood clogs from being formed. Facultatively, the patient is echocardiographically examined at defined intervals.

The hooks 19 situated at the circumference of the occluder 1 are in "rest position" on the occluder during the transport in the port. Also, within the framework of the interventional atrial occlusion of the occluder 1, it unfolds during the transport in an elongate, tube-like shape within the catheter up to the distal mouth without the hooks 19 becoming effective. This applies also until shortly before the end of the implantation process. Only by the compression existing in the left atrial appendage 24 after releasing the complete occluder 1, the hooks 19 protrude from the surface of the occluder 1 and ensure a solid anchoring within the left atrial appendage 24. So that a sure compression is achieved and the occluder 1 can stationarily position within the atrial appendage 24, the occluder 1 to be inserted according to FIG. 15a, the occluder 1 without a proximal cover according to FIG. 14 and FIG. 15b, with a proximal cover according to FIG. 11, should be circumferentially about 5 to 10% larger than the atrial appendage diameter within the retention area 26 of the atrial appendage 24 so as to achieve a secure final position as can be seen in FIG. 15a and FIG. 15b. In case of very open, almost bathtub-like atrial appendages 24, as can be seen in FIG. 16, two occluders 1 may be implanted for closing the left atrial appendage, wherein the second occluder 1 should be inserted in a time-delayed manner about 6 weeks after the first implantation. By way of example, two occluders 1 without a proximal cover are implanted in FIG. 16. In FIG. 17 there was a real hybrid application by using an atrial occluder without a proximal cover, and subsequently an occluder with a proximal cover.

As a whole, all of the embodiments according to the invention, from the material side, can be replaced by bioresorbable material exhibiting substantially comparable elastic properties. However, analogous heat treatment processes take place far below, below of 140°.

LIST OF REFERENCE NUMERALS 1 occluder
2 front view
3 side view
4 top view
5 detail view
6 sectional representation
7 spatial representation
8 nitinol tube
9 lasered envelope
10 proximal end
11 proximal retention area
12 distal end
13 distal retention area
14 cover
15 waist or web
16 diaphragm
17 open end of the diaphragm
18 shape elements
19 hooks
20 threaded coupling
21 patches
22 area with hooks
23 left atrium
24 left atrial appendage
25 atrial appendage inlet
26 atrial appendage retention area
27 laser incision
28 tool mandrel 1
29 tool receptacle
30 tool mandrel 2
31 tool mandrel 3
32 intermediate plate 1
33 covering 1
34 fixing bolt 1
35 device
36 middle axis
37 down-hold device
38 recess
39 shape area

The invention claimed is:

1. A hybrid occluder (1) for closing the left atrial appendage (24),
wherein the hybrid occluder includes at least one atrial appendage occluder having a proximal disk-shaped cover or without the proximal disk-shaped cover,
wherein the occluder (1) in its basic shape is composed of a solid compound of a rotationally symmetrical envelope (9) being formed as a solid unitary piece, processed by laser, having self-expanding properties and means for the secure and gentle anchoring in the retention area of the atrial appendage (26),
wherein the means for secure and gentle anchoring are axially and radially oriented small hooks, situated in the retention area of the occluder,
wherein the small hooks will only be effective when the occluder is released within the atrial appendage and a corresponding compression force acts upon the outer envelope of the occluder via the bearing stress, which compresses the occluder by 3% to 10%,
wherein the occluder is equipped with or without the proximal disk-shaped cover (14), wherein furthermore for sealing the blood flow at least one tissue layer of patches (21) being respectively incorporated at the proximal end (10) so as to enable the interventional atrium occlusion of the left atrial appendage (24) based on a venous transseptal access,
wherein the hooks (19) are in forced radial orientation which is permanently secured by a following heat treatment,
and wherein the hooks (19) of the occluder are bended towards the proximal retention area (11) and/or the proximal disk-shaped cover (14) in a radius of curvature defined by a radius of a shape part (39).

2. The hybrid occluder according to claim 1,
characterized in that
it consists of metal or memory metal alloys or of non-resorbable plastics selected from the group of polyesters, polyamides, polyolefins, polyurethanes and polyhalogeno olefins.

3. The hybrid occluder according to claim 1,
characterized in that
it is formed of bio-resorbable polymers and other polyesters, polyanhydrides and polyamine acids having cleavable bonds and has a degradation duration between five and fifty weeks.

4. The hybrid occluder according to claim 3,
characterized in that
the bio-resorbable polymer has a glass transition point of at least 41.5° C. and represents a fermentatively fabricated polyhydroxyalkanoat or a synthetically resorbable polymer,
wherein the resorbable polymer either is a homopolymer, a static co-polymer or a block co-polymer, wherein a polymer formed of at least two of the mentioned monomer components is to be understood as a co-polymer.

5. The hybrid occluder according to claim 3,
characterized in that
the resorbable polymer contains 70 wt.-% to 97 wt.-% L or DL lactide,
wherein the residual amount to 100 wt.-% is formed from glycolide, ε-caprolactone, p-dioxanone and thrimethylene carbonate or a combination of these monomers.

6. The hybrid occluder according to claim 1,
characterized in that
it consists of bio-resorbable polymers having shape-memory properties, wherein biodegradable amorphous polymer networks are used such that rubber-elastic materials are formed by heating these networks to about 20° C. above the switching temperature, which between 5° and 265° C. are deformable to a temporary shape and result in polymers having considerably higher tensile elasticity moduli by cooling down to room temperature.

7. The hybrid occluder according to claim 2, characterized in that the metal or memory metal alloy is nitinol.

8. The hybrid occluder according to claim 3, characterized in that the bio-resorbable polymers are polyester, polylactic acid PLA, polyglycol acid PGA and the cleavable bonds of the polyamine acids are amide, ester or acetal bonds.

9. The hybrid occluder according to claim 4, characterized in that the synthetically resorbable polymer is formed of the monomer components lactide, glycolide, ε-caprolactone, p-dioxanone and thrimethylene carbonate.

10. The hybrid occluder according to claim 5, characterized in that the resorbable polymer contains 80 wt.-% to 95 wt.-% L or DL lactide.

11. The hybrid occluder according to claim 10, characterized in that the resorbable polymer contains 88 wt.-% to 93 wt.-% L or DL lactide.

12. The hybrid occluder according to claim 6, characterized in that the biodegradable amorphous polymer networks are amorphous polyurethane, co-polyester, or polymer networks having a glass transition temperature of between 48 and 66° C.

* * * * *